United States Patent
Kaiser et al.

(10) Patent No.: US 11,334,805 B2
(45) Date of Patent: May 17, 2022

(54) CASE-BASED REASONING AS A CLOUD SERVICE

(71) Applicant: SAP SE, Walldorf (DE)

(72) Inventors: Matthias Kaiser, Walldorf (DE); Vladimir Shapiro, Sinsheim (DE); Luisa Andre, Karlsruhe (DE); Roman Rommel, Neustadt an der Weinstrasse (DE); Max-Samuel Lang, Heidelberg (DE); Jochen Steinbach, Bad Schoenborn (DE); Kai Richter, Muehital (DE); Thomas Ryborz, Heidelberg (DE)

(73) Assignee: SAP SE, Walldorf (DE)

( * ) Notice: Subject to any disclaimer, the term of this patent is extended or adjusted under 35 U.S.C. 154(b) by 884 days.

(21) Appl. No.: 16/161,245

(22) Filed: Oct. 16, 2018

(65) Prior Publication Data

US 2020/0118011 A1  Apr. 16, 2020

(51) Int. Cl.
G06N 5/04 (2006.01)
G06N 99/00 (2019.01)
G06N 20/00 (2019.01)

(52) U.S. Cl.
CPC .............. *G06N 5/04* (2013.01); *G06N 20/00* (2019.01)

(58) Field of Classification Search
CPC ...... G06Q 10/0631; G06N 20/00; G06N 5/04; H04L 67/10
See application file for complete search history.

(56) References Cited

U.S. PATENT DOCUMENTS

| | | | |
|---|---|---|---|
| 6,741,959 B1 | 5/2004 | Kaiser |
| 7,165,066 B2 | 1/2007 | Kaiser |
| 7,228,329 B2 | 6/2007 | Kaiser |
| 7,519,602 B2 | 4/2009 | Klemba et al. |
| 7,551,975 B2 | 6/2009 | Steinbach et al. |
| 7,587,324 B2 | 9/2009 | Kaiser |
| 7,617,015 B2 | 11/2009 | Steinbach et al. |
| 7,676,489 B2 | 3/2010 | Kaiser |
| 7,720,674 B2 | 5/2010 | Kaiser et al. |
| 7,840,451 B2 | 11/2010 | Kaiser |
| 7,865,887 B2 | 1/2011 | Kaiser |
| 7,894,922 B2 | 2/2011 | Steinbach et al. |

(Continued)

*Primary Examiner* — Abdullahi E Salad
(74) *Attorney, Agent, or Firm* — Fish & Richardson P.C.

(57) ABSTRACT

The disclosure generally describes methods, software, and systems for providing solution descriptions. A problem description of a problem is received, from a client, at a cloud-based reasoning service. A solution description for a solution to the problem is received. Case metadata for a case defining the problem and solution are generated by the cloud-based reasoning service. The case metadata, including the problem description and solution description, are stored by the cloud-based reasoning service in a cases repository associating solutions with problems. A new problem is received at the cloud-based reasoning service. An automated analysis of the new problem is performed, and a comparison is made of the new problem with existing solutions in the cases repository to identify solutions matching the new problem. A new solution description is provided that is based on a match between the new problem description and the problem description and using the problem solution.

17 Claims, 17 Drawing Sheets

(56) References Cited

U.S. PATENT DOCUMENTS

| | | |
|---|---|---|
| 7,979,295 B2 | 7/2011 | Kaiser |
| 7,984,440 B2 | 7/2011 | James et al. |
| 8,027,857 B2 | 9/2011 | Steinbach et al. |
| 8,131,668 B2 | 3/2012 | Beringer et al. |
| 8,311,904 B2 | 11/2012 | Steinbach et al. |
| 8,321,250 B2 | 11/2012 | Pachter et al. |
| 8,326,706 B2 | 12/2012 | Clemens et al. |
| 8,341,031 B2 | 12/2012 | Steinbach et al. |
| 8,359,218 B2 | 1/2013 | Poth et al. |
| 8,386,325 B2 | 2/2013 | Bock et al. |
| 8,402,426 B2 | 3/2013 | Alfandary et al. |
| 8,417,549 B2 | 4/2013 | Rakesh et al. |
| 8,594,997 B2 | 11/2013 | Soltani et al. |
| 8,595,077 B2 | 11/2013 | Koegler et al. |
| 8,655,750 B2 | 2/2014 | Kaiser |
| 8,712,953 B2 | 4/2014 | Beringer et al. |
| 8,775,450 B2 | 7/2014 | Klemba et al. |
| 8,782,530 B2 | 7/2014 | Beringer et al. |
| 8,805,675 B2 | 8/2014 | Kaiser |
| 8,924,269 B2 | 12/2014 | Seubert et al. |
| 8,954,360 B2 | 2/2015 | Heidasch et al. |
| 9,064,220 B2 | 6/2015 | Brosche et al. |
| 9,299,025 B1* | 3/2016 | Rubin .................... G06N 5/025 |
| 9,626,231 B2 | 4/2017 | Steinbach et al. |
| 9,779,135 B2 | 10/2017 | Heidasch et al. |
| D816,104 S | 4/2018 | Rauschenbach et al. |
| D827,656 S | 9/2018 | Rauschenbach et al. |
| 2004/0044542 A1* | 3/2004 | Beniaminy ............ G06N 5/022 706/45 |
| 2004/0083191 A1* | 4/2004 | Ronnewinkel ......... G06Q 10/10 706/20 |
| 2005/0071217 A1* | 3/2005 | Hoogs ................ G06Q 10/0635 705/7.28 |
| 2005/0228774 A1* | 10/2005 | Ronnewinkel ........ G06F 16/353 |
| 2007/0094217 A1* | 4/2007 | Ronnewinkel ........ G06F 16/353 706/52 |
| 2007/0094218 A1* | 4/2007 | Vasudevan ............... G06N 7/02 706/52 |
| 2008/0288280 A1* | 11/2008 | Belcher ................. G06Q 10/10 705/2 |
| 2013/0297544 A1* | 11/2013 | Allgaier ................ G06N 20/00 706/46 |
| 2015/0127583 A1* | 5/2015 | Allgaier ................ G06N 20/00 706/11 |
| 2020/0125968 A1* | 4/2020 | Hazard .................. G06N 5/025 |

\* cited by examiner

FIG. 2B

| 260 Change Alert | 262 Operation Affected | 264 Delay | 266 Urgency of order | 268 Order Change | 270 Method |
|---|---|---|---|---|---|
| yes/no | (upstream/downstream/both) | none/small/high | low/high | | |
| 0.6 | 1 | 0.8 | 0.8 | | |
| yes | up | high | high | no | |
| yes | up | high | low | Rework | |
| yes | both | none | low | down | auto |
| no | down | small | low | no | |
| yes | both | small | high | Rework | manual |
| yes | up | high | low | Rework | manual |
| no | up | small | low | no | |
| no | up | none | low | no | |
| yes | down | small | high | down | auto |
| no | both | none | low | down | auto |
| no | both | none | high | down | auto |
| no | both | high | high | no | |
| no | down | none | low | down | auto |
| no | up | none | low | no | |
| no | both | small | high | Rework | manual |
| no | up | none | low | no | |
| yes | down | small | low | no | |
| yes | up | small | low | Rework | manual |
| no | up | high | high | no | |
| yes | down | small | high | down | auto |
| no | up | none | low | Rework | manual |
| no | both | high | high | no | |
| no | up | high | high | no | |
| no | down | high | high | no | |
| no | down | none | low | down | auto |
| no | up | high | low | no | |
| yes | up | none | low | no | |
| yes | both | none | high | down | manual |
| yes | both | high | high | no | |
| yes | both | high | low | Rework | manual |
| no | both | high | high | no | |
| yes | up | none | low | Rework | manual |
| yes | up | none | low | Rework | manual |
| no | both | high | high | no | |
| no | up | none | low | no | |
| no | both | none | low | down | manual |
| no | down | none | high | down | auto |

Change Requests (101)

Add Case ⚙

| Case | Reason | Change Alert | Operation | Delay | Urgency |
|---|---|---|---|---|---|
| Case 1 | Quality | yes | up | high | high |
| Case 2 | Customer | yes | up | high | low |
| Case 3 | Cost | yes | both | none | low |
| Case 4 | Cost | no | down | small | low |
| Case 5 | Customer | yes | both | small | high |
| Case 6 | Quality | yes | up | high | low |
| Case 7 | Customer | no | both | small | low |
| Case 8 | Customer | no | up | none | low |
| Case 9 | Quality | yes | down | small | high |
| Case 10 | Customer | no | both | none | low |
| Case 11 | Cost | no | both | none | high |
| Case 12 | Cost | no | both | high | high |
| Case 13 | Cost | no | down | none | low |

Case 4: Cost Change
Class: Production Order: Issues
Views: 156

Created By: Max Mustermann    Revised By: Max Mustermann    Status: Active
Created On: 01/10/2020          Created On: 01/11/2020

General Details | Recommendation | Similar Cases

Change in PO2020-5323-012 was introduced because of cost reasons. It affects standard times. The change can be implemented with some delay.

Production Order: 2020-5323-04
Plant: Bloomington (PLANT01)
Customer: Mustermann Aerospace AG Order Urgency: low
Expected Delay: small Operations Affected: down Change Alert: no Recommendation System Recommendation: Automatic Downport
User Recommendation: No Rework Similar Cases

| Case | Reason | Change Alert | Operation | Delay | Urgency | Solution | Confidence |
|---|---|---|---|---|---|---|---|
| Case 88 | Cost | no | down | small | low | Automatic Downport | 0.92 |
| Case 78 | Customer | no | down | small | low | Automatic Downport | 0.88 |
| Case 70 | Cost | no | down | small | low | Automatic Downport | 0.85 |

| Case | Reason | Change Alert | Operation | Delay | Urgency | |
|---|---|---|---|---|---|---|
| Case 1 | Quality | yes | up | high | high | › |
| Case 2 | Customer | yes | up | high | low | › |
| Case 3 | Cost | yes | both | none | low | › |
| Case 4 | Cost | no | down | small | low | › |
| Case 5 | Customer | yes | both | small | high | › |
| Case 6 | Quality | yes | up | high | low | › |
| Case 7 | Customer | no | up | small | low | › |
| Case 8 | Customer | no | up | none | low | › |
| Case 9 | Quality | yes | down | small | high | › |
| Case 10 | Customer | no | both | none | low | › |
| Case 11 | Cost | no | both | none | high | › |
| Case 12 | Cost | no | both | high | high | › |
| Case 13 | Cost | no | down | none | low | › |

Case 4: Cost Change
Class: Production Order Issues
Views: 156

General Details

Change in PO2020-5323-012 was introduced because of cost reasons. It affects standard times. The change can be implemented with some delay.

Production Order: 2020-5323-04
Plant: Bloomington (PLANT01)
Customer: Mustermann
 Aerospace AG Recommendation System Recommendation
Automatic Downport Similar Cases

| Case | Reason |
|---|---|
| Case 88 | Cost |
| Case 76 | Customer |
| Case 70 | Cost |

FIG. 2Ca

CASE-BASED REASONING AS A CLOUD SERVICE

BACKGROUND

The present disclosure relates to enterprise solutions. For example, a team that implements an intelligent enterprise solution can face several challenges and problems. Some modern machine-learning algorithms may depend on large amounts of data, may require a dedicated training environment, or may suffer from specific user experience (UX) issues, such as a lack of transparency regarding the data results. Problems such as these may require complex solutions that may be tailored to specific use cases. A final design of an enterprise solution may be too customized and scalable, which may provide significant disadvantages for an enterprise solution running in the cloud.

SUMMARY

This disclosure generally describes computer-implemented methods, software, and systems for providing a case-based reasoning system available through the cloud. One computer-implemented method includes: receiving, at a case-based reasoning service and from a client, a problem description of a problem; receiving, at the case-based reasoning service and from the client, a solution description for a solution to the problem; generating, by the case-based reasoning service, case metadata for a case that defines the problem and the solution; storing, by the case-based reasoning service, the problem description, the solution description, and the case metadata in a cases repository associating solutions with problems; receiving, at the case-based reasoning service and from the client, a new problem; performing an automated analysis of the new problem and comparison of the new problem with existing solutions in the cases repository to identify solutions matching the new problem; and providing, by the case-based reasoning service and to the client, a new solution description based on a match between the new problem description and the problem description and using the problem solution.

The foregoing and other implementations can each optionally include one or more of the following features, alone or in combination. In particular, one implementation can include all the following features:

In a first aspect, combinable with any of the previous aspects, wherein the problem description includes one or more of a vector of problem attributes and problem text, and wherein the solution description includes one or more of a vector of solution attributes and solution text.

In a second aspect, combinable with any of the previous aspects, wherein providing the new solution description includes identifying, from the cases repository, at least one solution associated with at least one problem having a problem description matching a new problem description of the new problem.

In a third aspect, combinable with any of the previous aspects, wherein the case metadata includes case owner information, case creation and modification dates, and relationships to other cases.

In a fourth aspect, combinable with any of the previous aspects, wherein the problem description, the solution description, the new problem description, and the new solution description are sent through an application programming interface (API) used by a client accessing the case-based reasoning service through the cloud.

In a fifth aspect, combinable with any of the previous aspects, further comprising: receiving, at the case-based reasoning service and from the client, updates to the solution description for the case; and updating, by the case-based reasoning service, the solution description for the case in the cases repository.

In a sixth aspect, combinable with any of the previous aspects, further comprising: receiving, at the case-based reasoning service and from the client, a share authorization for the case; and updating, by the case-based reasoning service, the cases repository to make the case accessible by other clients.

In a seventh aspect, combinable with any of the previous aspects, further comprising: receiving, at the case-based reasoning service and from the client, feedback associated with the new solution description; and updating, by the case-based reasoning service and using the feedback, statistics about that new solution description.

In an eighth aspect, combinable with any of the previous aspects, further comprising: determining, by the case-based reasoning service and using the feedback, that the new solution description has not been selected; identifying, by the case-based reasoning service and using the feedback, an expert to contact or another solution avenue; and providing, by the case-based reasoning service and to the client, information identifying the expert to contact or the other solution avenue.

In a ninth aspect, combinable with any of the previous aspects, further comprising: determining, by the case-based reasoning service and using the feedback, whether the new solution description is an exact solution to the problem; and when the new solution description is not an exact solution to the problem: determining, by the case-based reasoning service, that a duplicate solution is needed; determining, by the case-based reasoning service and using the feedback, the duplicate solution; providing, by the case-based reasoning service and to the client, a new solution description of the duplicate solution; and updating, by the case-based reasoning service, the cases repository to include the new solution description.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
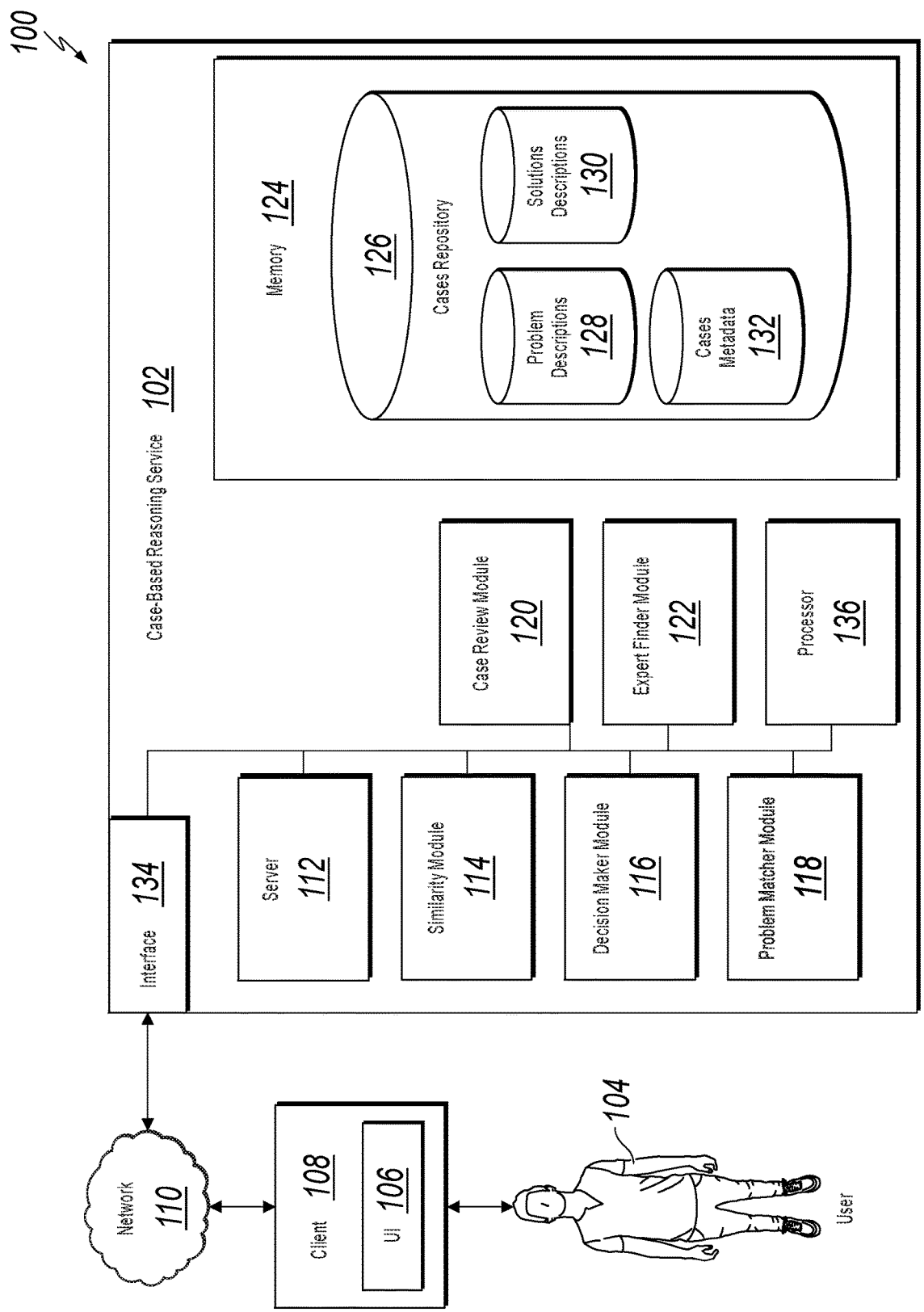
FIG. 1 is a block diagram of an example environment that provides a case-based reasoning service (CBRS).

This disclosure generally describes computer-implemented methods, software, and systems for a case-based reasoning service in the cloud. Case-based reasoning (CBR) is a well-known method of computer reasoning in which new problems can be solved based on solutions of similar past problems.

In some implementations, a cloud-based CBR service (CBRS) can provide complete functionalities of a CBR reasoning cycle. The functionalities can include retrieve, reuse, revise, and retain functionalities that are available across all enterprise applications. The service can be built on the universal case format and a set of standardized application programming interfaces (APIs) for CBR functionality.

Approaches for providing the service can combine common advantages of CBR with a cloud approach, making the functionality available to a variety of enterprise use cases with a very limited or a zero-custom footprint.

The CBRS can provide many advantages over conventional machine-learning (ML) approaches for enterprise applications. For example, transparency can be realized since a user can understand a suggested solution based on similar solutions from the past. Incremental learning can permit the CBRS to be used without requiring a large amount of data to start. This is because the system can learn case-by-case, and learned knowledge can evolve over time with each use. Another advantage is a social component, as the system can learn not only from the data of multiple users, but from information provided by experts.

There are other advantages of running CBR as a cloud-based service for enterprise applications. A universal case format and the use of application programming interfaces can provide applications with access to standard CBR services. In this way, applications can implement their own CBR cycle of retrieve, reuse, revise, and retain. A shared case database for the central storage of cases can allow users to share the expertise not only within one company but also among different experts in related fields or industries. Companies can also offer their case databases as a service. A scalable architecture can include a separated and de-coupled user interface (UI), a CBR service, and data provisioning services. The architecture can allow a flexible implementation on different platforms and technology stacks.

This disclosure focuses on the cloud-based aspect of the system. When a problem or case is presented, a determination can be made as to which silo or application the incoming problem or case is related to. A particular case can be related, for example, to a specific application, a specific user, or a group of users associated with an application. The system can support one company's use of their application and their solutions, or the system can be used for shared partner or industry information. The system can access a stored set of case information that coordinates to a given user in the cloud to perform an analysis to determine which solutions and existing cases match and can assist with a request. In some implementations, tools or modules for the evaluation for similarity can be a pluggable solution, depending on the type of input and the appropriate evaluation for a specific analysis. The system can determine solutions at runtime or based on specific instructions for particular users, user groups, or contexts. A service-oriented architecture provided by the system can be scaled dynamically with the number of users accessing the service. For example, additional containers (such as Docker containers) can be booted up automatically using orchestrators as user loads increase.

FIG. 1 is a block diagram of an example environment 100 that provides a case-based reasoning service (CBRS) 102. The environment 100 includes a user 104 who can use the CBRS 102 as a service for storing, retrieving, reusing, and updating cases of problems and corresponding solutions. The user 104 can use or interact with a UI 106 (for example, associated with one or more applications) that runs on a client 108 (for example, a mobile device, laptop computer, or other computing device) to interact with the CBRS 102. In some implementations, applications that support the UI 106 can include APIs for sending and receiving problem descriptions, solution descriptions, new problem descriptions, and new solution descriptions for use by the client 108 in sending information through the cloud to the CBRS 102. A network 110 (for example, the Internet) can support communication among the components of the environment 100. Interactions among the components of the environment 100 are described in more detail with reference to the swim lane diagrams of FIGS. 6-8.

The CBRS 102 includes a server 112 that receives requests initiated by the user 104 to store, retrieve, reuse, and update cases. The server 112 can handle the requests and generate messages (based on the request) to be sent to other components of the CBRS 102. For example, a similarity module 114 that perform one or more algorithms used to determine a similarity between a user's new or current problem and one or more existing problems previously defined in or associated with the CBRS 102. The similarity module 114 can identify similar cases and assign a confidence level for each case that identifies a percentage, score, or other measure indicating a likelihood that the solution will resolve the user's problem. The similarity module 114 can provide, for use by the user 104, uniform resource locators (URLs) that the user 104 can use to provide feedback.

A decision maker module 116 can make decisions as to whether a solution will be reused or some other action will be taken. The decision maker module 116 can enter into various stages of operation depending, for example, on whether a solution is going to be reused or replaced.

A problem matcher module 118 can compare the user's problem with the problem of existing cases and corresponding problems. The problem matcher module 118 can include functions that are executed to determine whether a new problem matches an existing problem of a case stored by the CBRS 102.

A case review module 120 can create new cases or revise existing cases based on information associated with a new case received from the user and a solution selected by the user. An expert finder module 122 can identify experts that may be able to assist in the user's problem. Identifying experts may be necessary, for example, if the CBRS 102 is unable to identify a case with a solution that is likely to resolve the user's problem. In some implementations, cases and solutions are only selected if a confidence level of the solutions is above a threshold. Confidence-level thresholds can exist, for example, at the level of individual users, groups of users, organizations, or by application.

The CBRS 102 includes a memory 124 that can store a cases repository 126. The cases repository 126 includes problem descriptions 128, solution descriptions 130, and cases metadata 132. The problem descriptions 128 can be used by the problem matcher module 118 to compare a user's new problem with existing cases and corresponding problem descriptions 128 and solution descriptions 130. The problem descriptions 128 can include one or more of a vector of problem attributes and problem text, wherein the solution description 130 includes one or more of a vector of solution attributes and solution text. The solution descriptions 130 can describe, for each solution to a problem, automatic and manual operations that are to be taken to resolve a problem. The metadata 132 can track usage of existing cases in resolving new cases. The metadata 132 can include, for example, case owner information, case creation and modification dates, and relationships to other cases. In some implementations, information from the metadata 132, such as successful case reuse and selection rates, can increase the chances that a particular existing case will be chosen in response to a new problem.

The CBRS 102 includes an interface 134 for receiving inputs (for example, requests and case information to be stored) and for transmitting responses generated by the server 112. A processor 136 can execute instructions of modules and other components of the CBRS 102.

Figure 2A:
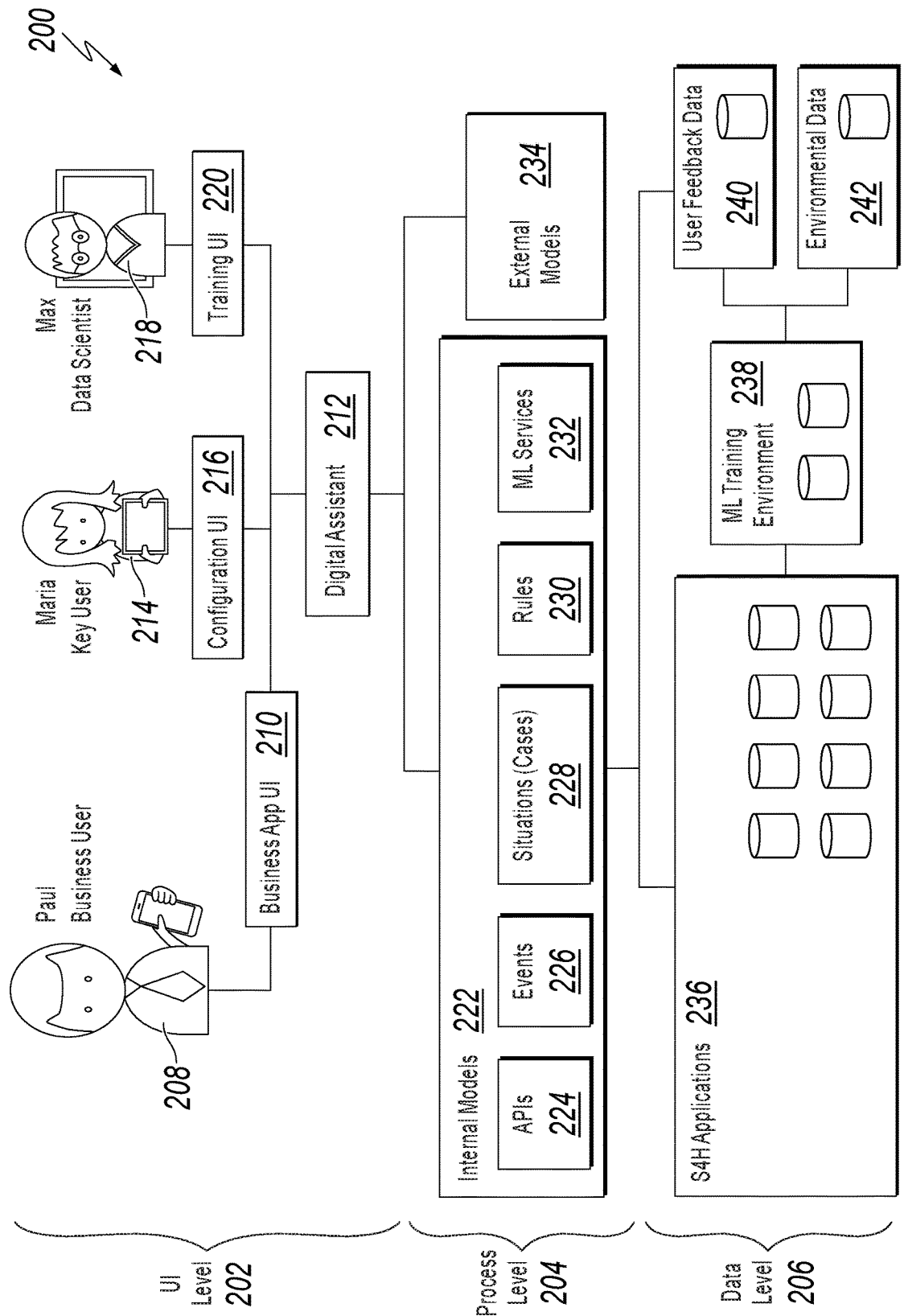
FIG. 2A is a block diagram of an example environment for using the CBRS.

FIG. 2A is a block diagram of an example environment 200 for using the CBRS 102. The environment 200 includes a UI level 202 that communicates through a process level 204 to a data level 206 that includes information describing problems and solutions, such as in a cases repository.

The UI level 202 includes a user 208 (for example, a business user) who can use a business application (app) UI 210 (for example, on a mobile device) to use the CBRS. Other users who use the CBRS can include a key user 214 (for example, using a configuration UI 216 to set up the CBRS) and a data scientist 218 (for example, using a training UI 220 allowing the data scientist 218 to provide training and other expertise).

At the process level 204, a digital assistant 212 can serve as an underlying application and the user interface for users of the CBRS. The digital assistant 212 can access internal models 222 that model and provide access to cases that relate problems to solutions. The models 222 can supply application programming interfaces (APIs) 224 that can be used at the application level to access information related to cases. Information associated with events 226 can be used to persist data changes together and associate the data changes with an event which triggered the data modification, for example, deleteUser or createBankAccount. For example, further processing steps that are usually executed by programs automatically can be stored as events. In an example, a customer can use a chat bot to ask for a room reservation. The chat bot can offer an empty room to the customer. Declining the offer can cause the creation of a "declineOffer" event, which would lead to different solution proposal than an "acceptOffer" event, based on logic implemented in the system. Situations 228 can identify cases, including problems and solutions and their relationships. Rules 230 can define how solutions are mapped to and accessed for particular problems. Rules can be used to make decisions in specific situations, such as based on an urgency, a priority, costs, or other parameters. For example, if Machine X is broken, a loss in revenue per hour can be $100,000, and a rule that is based at least on urgency and cost can indicate an action to "order as soon as possible." If Machine Y broken, for example, and production of Machine Y is in stock, a rule can indicate an action to "order as cheap as possible." Machine learning (ML) services 232 can provide resources that perform machine learning, such as to learn over time which existing cases' problems are likely to match a new problem presented by the user. The digital assistant 212 can also access external models 234, such as models that are not stored by the CBRS but that are available through the cloud.

At the data level 206, applications 236 can include applications that provide enterprise resource planning (ERP) solutions and that are simplified, cloud-based (accessible from mobile devices), and integrated with a cloud platform (on-premises and in the cloud). An ML training environment 238 can include information that is generated before the system can provide solutions. For example, the ML training environment 238 can prepare data, including vectorization, before solutions are provided. In some implementations, system may need to be trained before it can be used. User feedback data 240 can include information received from users as to which suggested solutions were used for a given problem and can include textual information regarding additional information such as to be used to change existing solutions or create new solutions. Environmental data 242 can include, for example, global positioning system (GPS) coordinates, system load information, and noise level information.

Figure 2B:
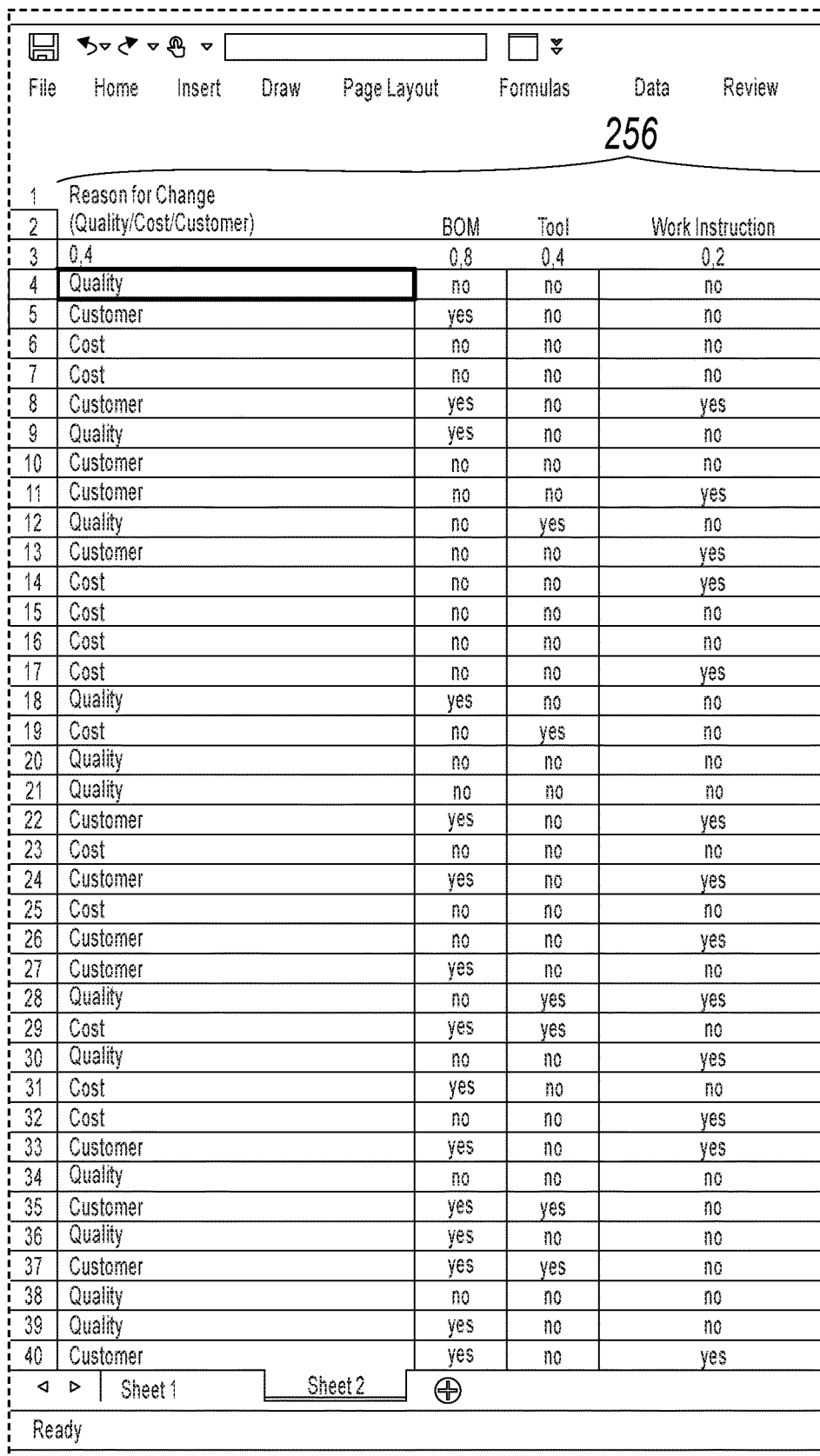
FIGS. 2B, 2Ba, 2Bb, and 2Bc collectively show a screen shot showing examples of case vectors.
Figure 2B:

FIGS. 2B, 2Ba, 2Bb, and 2Bc collectively show a screen shot showing examples of case vectors 250 associated with cases used in the environment 200. For example, each case vector 250 can include a problem vector 252 and a solution vector 254. The case vectors 250 can each include a problem statement (for example, reason for change, type of change) and a human decision that has been taken (for example, the solution vector 254).

Problem vectors 252 include a reason for change 256 (for example, identifying a quality, cost, or customer issue, whether a bill of materials (BOM) exists, whether a tool is related, and whether work instruction is included. A type of change 258 can specify whether an inspection characteristic exists, whether certification is present, whether buy-off is present, and standard times are used. A change alert 260 can indicate if an alert is issued. An operation affected 262 can indicate whether an operation is up, down, or both during the problem. A delay 264 can indicate a length of delay caused by the problem, such as high, small, or none. An urgency of order 266 can indicate whether fixing the problem has a high urgency or a low urgency. Solution vectors 254 can include an order change 268 (indicating whether an order requires a rework, a down system, or no change) and a method 270 (for example, indicating whether the solution action is automatic or manual).

Figure 2C:
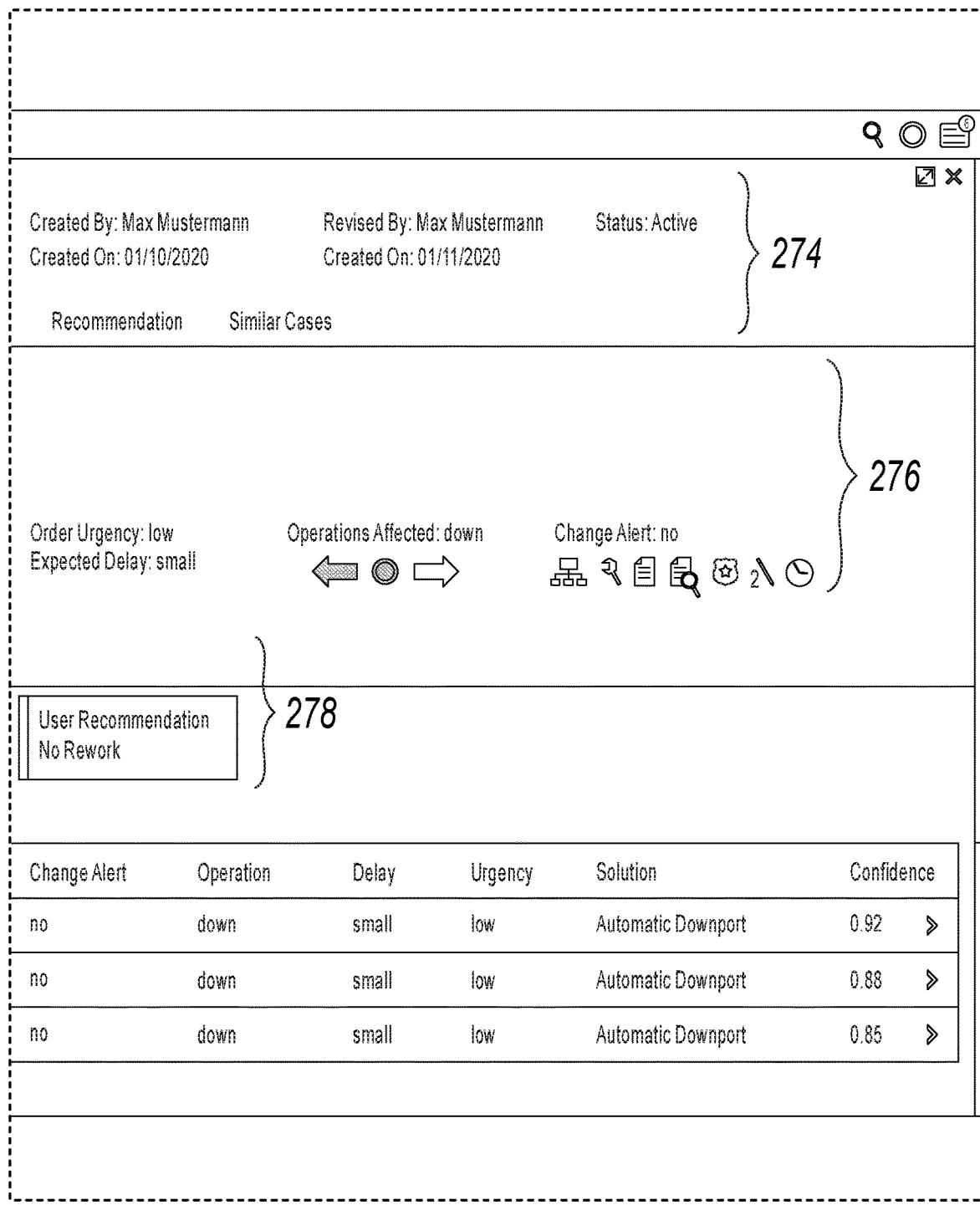
FIGS. 2C, 2Ca, and 2Cb collectively show a screen shot showing examples of case vectors and details of a specific case.

FIGS. 2C, 2Ca, and 2Cb collectively show a screen shot showing examples of case vectors 250 and details of a specific case 250a. Details of the case 250a are presented in a case details area 272. A case details description 274 provides details for the case 250a, including case information, creation and modification information (by case creators and modifiers), a case status, and a number of times the case has been viewed. Case modification information 276 identifies information regarding modifications to the case. Case recommendation information 278 provides recommendations for solving the case. A similar cases area 280 identified other related cases and their problems and solutions.

Figure 3:
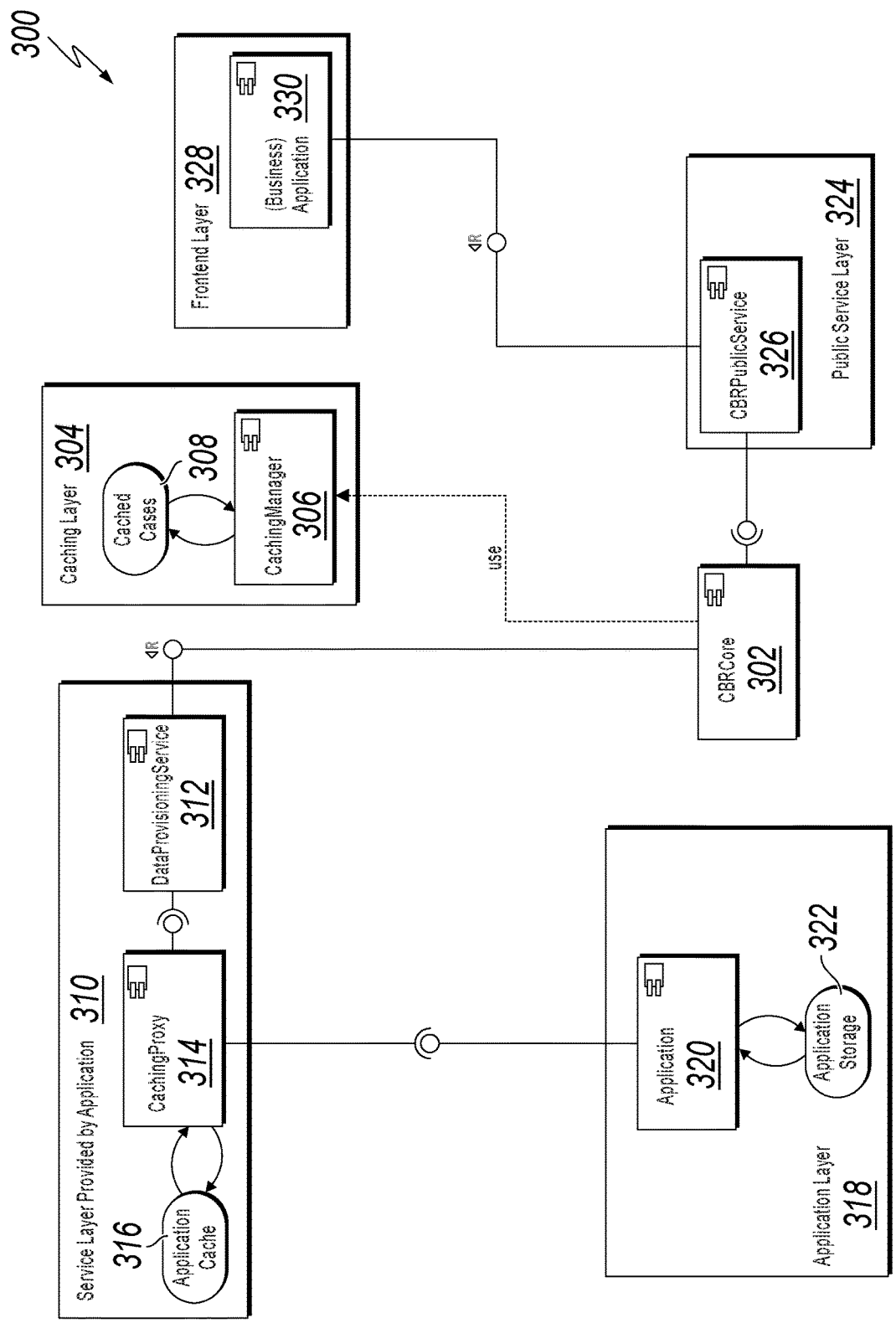
FIG. 3 is a block diagram of an example of an entity relationship diagram for entities related to cases provided by the CBRS.

FIG. 3 is a block diagram of an example of an entity relationship diagram 300 for entities related to cases provided by the CBRS. At the center of the entity relationship diagram 300 is a case-based reasoning (CBR) core 302. The CBR core 302 uses a caching layer 304 for perform caching for the CBRS. The caching layer 304 includes a caching manager 306 linked to cached cases 308. The CBR core 302 interfaces with a service layer 310 that can be provided by applications (for example, the digital assistant 212) and interfaces with UIs. Communications between the CBR core 302 and the service layer 310 use a data provisioning service 312 interfacing with a caching proxy 314 that operates an application cache 316. The service layer 310 communicates with an application layer 318 that includes applications 320 that use application storage 322. The CBR core 302 communicates with a public service layer 324 that includes CBR public services 326. The public service layer 324 communicates with a front-end layer 328 that provides business applications 330.

The CBR core 302 can contain all modules which are required to execute the learning process, including vectorizing the cases. In some implementations, caching capabilities can be absent, therefore the data from which to learn can be requested through hypertext transfer protocol (HTTP) (for example, WebSockets) or remote procedure call (RPC) sockets (for example, transmission control protocol (TCP) sockets) directly from the data provisioning service 312. A fetching mechanism can be enhanced in different ways, for example, replacing HTTP with WebSockets for a stateful communication channel to receive changes without closing the connection. In some implementations, a web hook can be used.

The caching manager 306 can be used to enhance performance by facilitating caching of information. The caching manager 306 can provide a flexibility to read cases directly from the cache which than can be used, for example, for vectorization of the data. In some implementations, the learning phase can be skipped and the vectorized data can be fetched directly from the cache which can save additional processing time. Caching of similar cases can also be used to prevent additional processing when a user has already asked for a similar case. In some implementations, storing data in the cache can use libraries such as Redis.

The public service layer 324 can be used for external access, for example, by applications. The public service layer 324 can implemented using a Representational State Transfer (REST) API with Hypermedia as the Engine of Application State (HATEOAS) and Hardware Abstraction Layer (HAL) to include hypermedia information for easy service exploration. In some implementations, public service layer 324 can be limited to providing just read-only (or get) operations. The public service layer 324 can provide restricted access, for example, requiring authentication.

The data provisioning service 312 can be implemented as a simple REST service that allows create/read/update/delete (CRUD) operations to create, read, update and delete new cases. Data from the cases can then be used as basis for learning by the CBR core 302.

The caching proxy 314 can be used to fetch and cache data without exercising an extra load on the productive system. The application layer 318 can contain basic business application rules.

Figure 4:
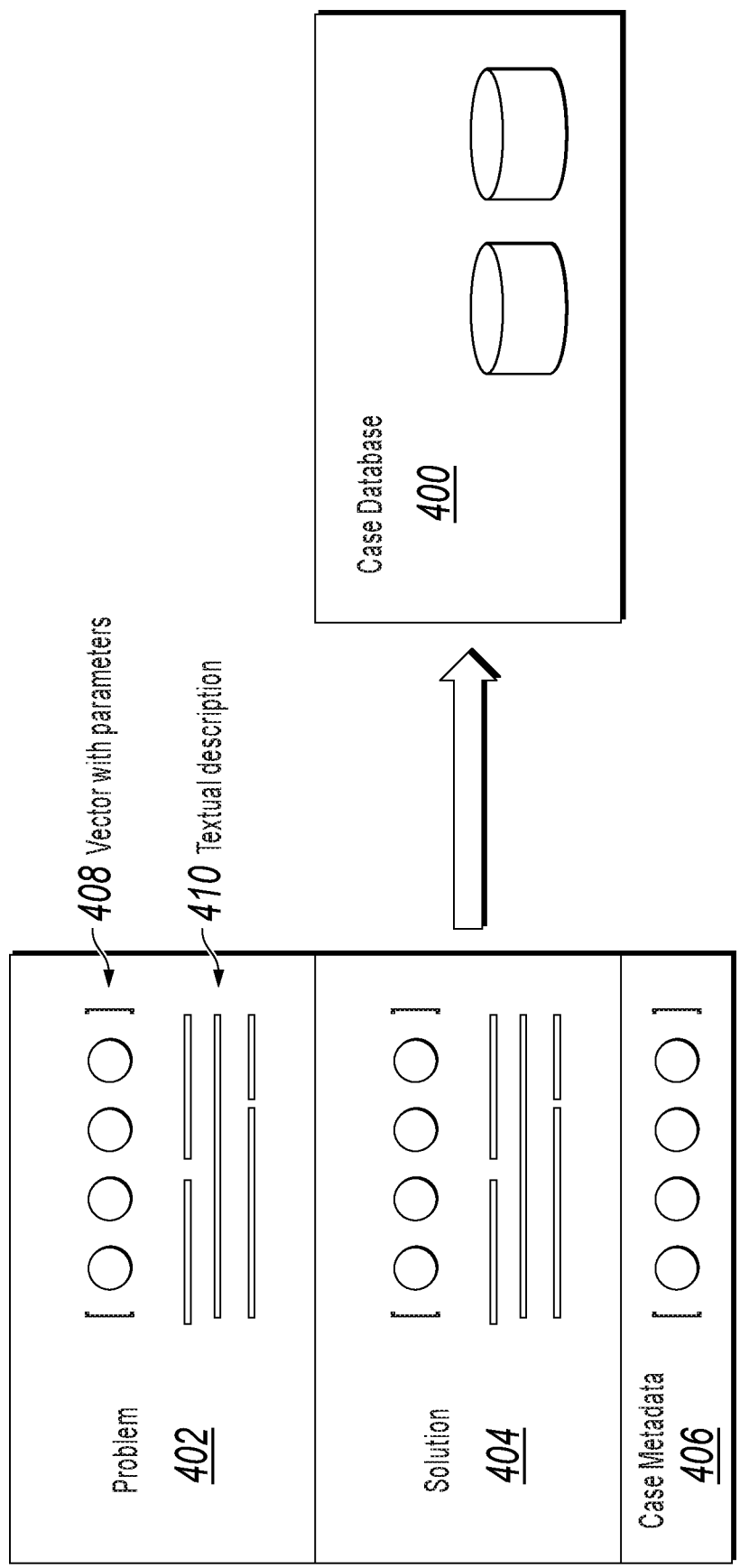
FIG. 4 is a block diagram showing example components of a case database for collecting and maintaining cases.

FIG. 4 is a block diagram showing example components of a case database 400 for collecting and maintaining cases.

The case database 400 can serve as a cases repository that is used by the CBRS to store solutions to problems and provide suggestion solutions to new problems. The cases database 400 can include information for problems 402, solutions 404, and case metadata 406. Information for problems 402 can include problem vectors with parameters 408 and a textual description 410.

A case can consist of the following parts. First, a problem description can store the description of the problem as a vector of attributes or/and as a text. The use of storing problems as both a vector and as text can make problems both human-readable and machine-readable. Second, a solution description can store a solution of the problem as a vector of attributes and as text (for example, to make solutions both human-readable and machine-readable. Third, metadata can store information about case owner, dates of creation and change, and relationships to other cases. For example, cases can have a hierarchical relationship in a case hierarchy.

In some implementations, case information can be stored using JavaScript Object Notation (JSON):

```
{
    "_id": "5a58860e2b7bde004437b850",
    "problem:" {
        "Reason": "Quality",
        "BOM": "no",
        "Tool": "no",
        "WorkInstruction": "no",
        "InspectionCharacteristic": "yes",
        "Certification": "yes",
        "BuyOff": "no",
        "StandardTimes": "no",
        "ChangeAlert": "yes",
        "OperationAffected": "up",
        "Delay": "high",
        "Urgency": "high"
    },
    "solution": {
        "OrderChange": "no",
        "OrderChangeMethod": ""
    },
    "meta": {
        "author": {"id": "E05323", "firstName": "Jacob",
        "lastName": "Mustermann" },
        "creationDate": "2018-01-20"
    }
}
```

In some implementations, case information can also be stored using relational tables, which can include a limitation of predefined schema for entities. The example JSON format uses main sections (for each of the problem, the solution, and the metadata) and an identification (ID), but does not define the contents of the sections. Other formats can be used implement and format the information and provide access by applications.

The python API can behave like a proxy which uses the original data and attaches additional information to the response. The additional information can include, for example, information relevant to the consumer (for example, for use in the application) which may be irrelevant at the core system where cases are handled. As an example, a function /cases/string:task_id can return an original object and an array with similar cases, for example:

```
{
    "similarCases": [
        {
            "case": {
                "_id": "5a58860e2b7bde004437b851",
                "ID": 2,
                "Reason": "Quality",
                "BOM": "no",
                "Tool": "no",
                "WorkInstruction": "no",
                "InspectionCharacteristic": "yes",
                "Certification": "yes",
                "BuyOff": "no",
                "StandardTimes": "no",
                "ChangeAlert": "yes",
                "OperationAffected": "up",
                "Delay": "high",
                "Urgency": "high",
                "OrderChange": "no",
                "OrderChangeMethod": ""
            },
            "confidenceLevel": 0.80
        },
    ],
    "_links": {
        "case": {
            "href": "https://cbr-dataprovisioning-
            service.cfapps.sap.hana.ondemand.com/api/cases/5a58860e2b7bde004437b850"
        }
    }
}
```

In some implementations, a JSON can be returned that contains N (for example, three) cases that are the most similar cases to a given case ID. Each case ID can identify a case in a database and accessed using an API.

In some implementations, additional functions can be used. A /getSolutionProposals/string:task_id or task/:task_id/solution function, for example, can return possible solution proposals using a HATEOAS pattern. A given solution can be a similar case, an expert contact, or a follow-up question. A /setSolutionProposals/string:task_id can allow an application to submit the solution chosen by the user (for example, using the user's feedback). Depending on input from the user (for example, a choice from cases provided by the user), the service can decide whether to create a new case, reuse an existing case, or update an existing case. Statistics can be updated based on the user's selection.

In some implementations, generic APIs can be used for executing generic operations (for example, CRUD operations) on a specific collection (for example, a set of cases). To be used with the generic API, the collection can be defined using a query parameter, for example, using parameters from the following table:

TABLE 1

Query Parameters

| Event | HTTP Method | API URL |
| --- | --- | --- |
| Get All Objects | GET | http://{host}:{port}/generic?collection={name} |
| Get Object by ID | GET | http://{host}:{port}/generic/{objectId}?collection={name} |
| Delete Object | DELETE | http://{host}:{port}/generic/{objectId}?collection={name} |
| Add Object | POST | http://{host}:{port}/generic?collection={name} |

Figure 5:
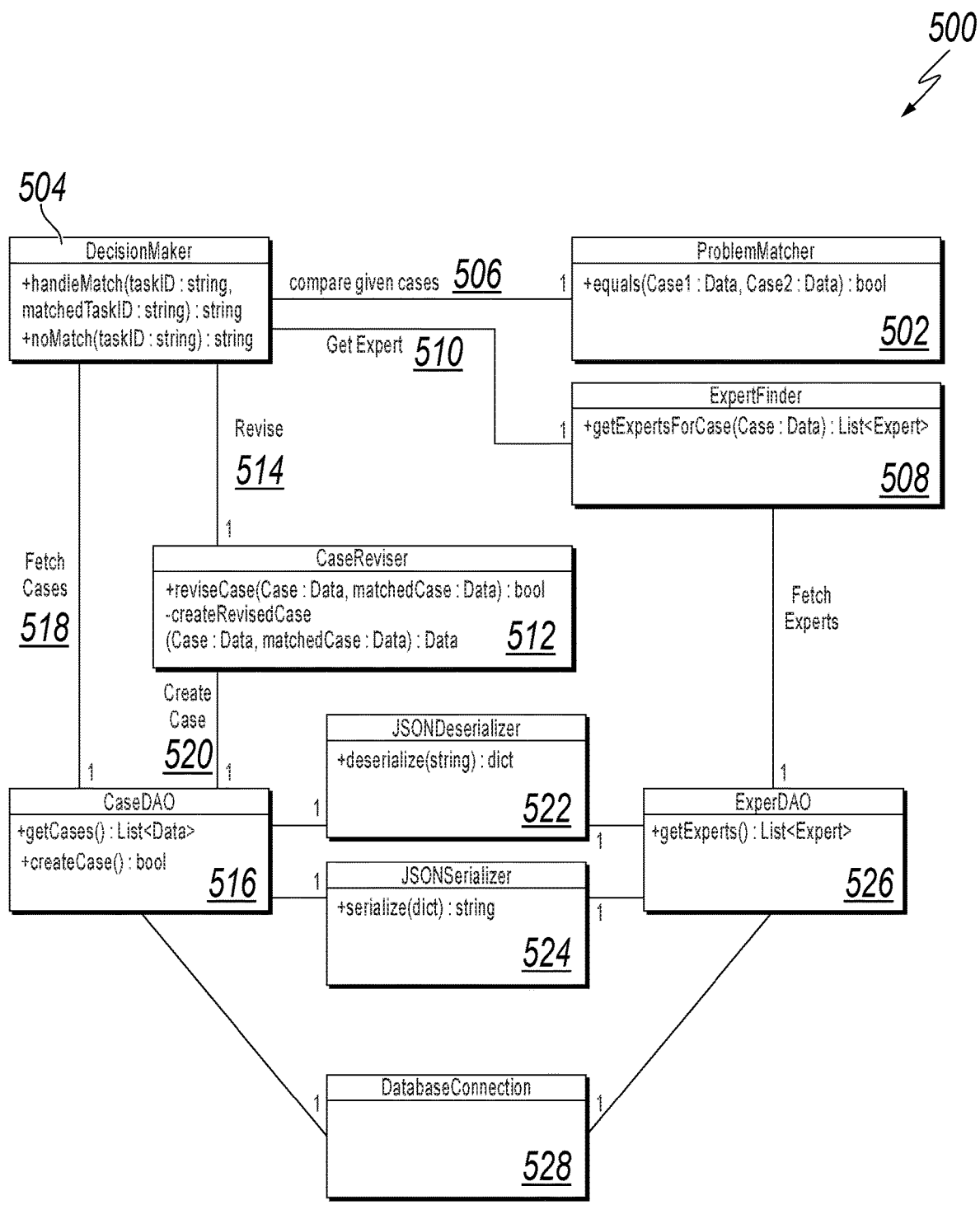
FIG. 5 is a block diagram showing example components of interrelated case entities.

FIG. 5 is a block diagram showing example components of interrelated case entities 500. The entities 500 include a problem matching node 502 that can interface with a decision maker node 504 to compare given cases 506 in order to identify existing solutions for a given new problem. If a solution cannot be identified, the decision maker node 504 can invoke an Expert finder node 508 to get an expert 510. If a solution is to be updated, for example, the decision maker node 504 can invoke a case reviewer node 512 to revise 514 a case.

The decision maker node 504 can invoke a case data access object (DAO) node 516, for example, to fetch cases 518 corresponding to a new problem. If a case is to be added, then the case reviewer node 512 can invoke the case DAO node 516 to create a case 520. The case DAO node 516 can use a JSON de-serializer node 522 and a JSON serializer node 524 to perform solution de-serializing and serializing, respectively. The nodes 522 and 524 can invoke an expert DAO node 526 to obtain expert information. The case DAO node 516 and the expert DAO node 526 can use a database connection 528. Nodes 502, 504, and 512 are nodes of Reuse and Revise classes. Nodes 516, 522, and 524 can serve as refactoring advice nodes.

Figure 6:
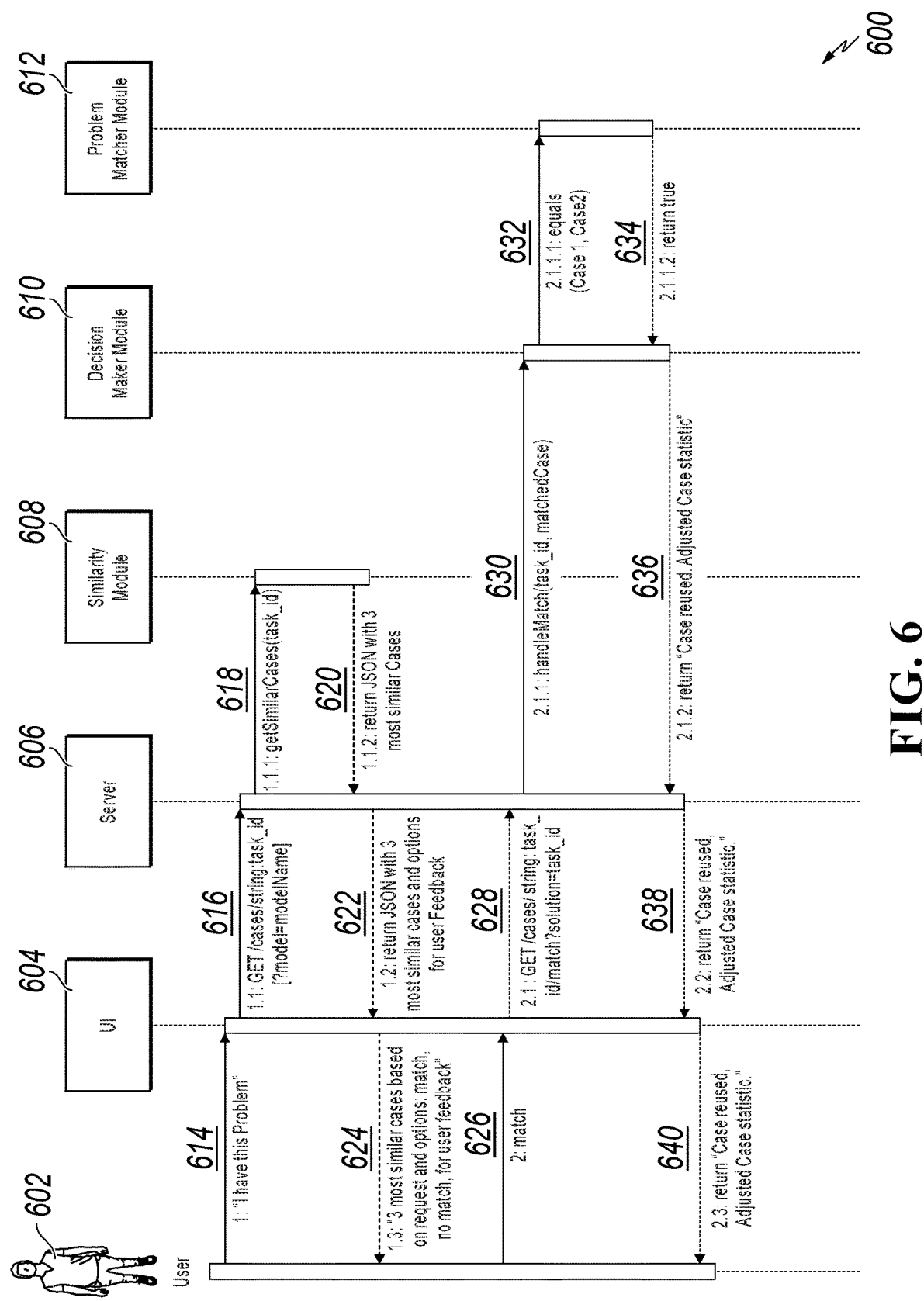
FIG. 6 is a swim lane diagram showing examples of steps and interactions in a process for reusing an existing case to provide a solution to a problem.

FIG. 6 is a swim lane diagram showing examples of operations and interactions in a process 600 for reusing an existing case to provide a solution to a problem. Operations and interactions of the process 600 include interactions among a user 602 (for example, the user 104), a UI 604 (for example, the UI 106), a server 606 (for example, the server 112), a similarity module 608 (for example, the similarity module 114), a decision maker module 610 (for example, the decision maker module 116), and a problem matcher module 612 (for example, the problem matcher module 118).

When a problem on the user's side occurs, a client on the user's side can send a message 614 to the UI 604, informing the UI 604 (for example, a UI of a CBR application, such as a user assistant application) of the problem. The application can enter or transform into a Retrieve stage, for example using a retrieve function 616 of an API (for example, the <<cbr-python_api>>), to request the most similar cases to the user's problem. The UI 604 can send the request to the server 606 using, for example, /cases/string:task_id in the request. The server 606 can forward the request using a message 618, for example, to call the similarity module 608 using a function getSimilarCases(task_id). The function can return a message 620 that includes the three cases that are most similar to the user's problem and a related confidence level for each case. The server 606 can return a message 622 that identifies the three most similar cases and includes URLs for the user 602 to provide feedback. User feedback options can include Match and No-match and whether a matching case's solution is being Reused or Revised. The UI 604 can provide a message 624 to the user 602 that identifies the three most similar cases and the options included.

If the user 602 decides that the second case of the three cases includes the solution needed for the user's problem, the user 602 can make a selection 626 for the option match. The UI 604 can generate a message 628 to the server 606, using the URL related to reuse of the case. The server 606 can send a message 630 to the decision maker module 610, for example, calling a handleMatch (task_id, matchedCase) function in a DecisionMaker class. The function can be used to decide whether the user triggered a Revise stage or a Reuse stage. The decision maker module 610 can compare the user's problem with the problem of the case and the selected solution. The decision maker module 610 can create and send a new object 632 to the problem matcher module 612. For example, the object 632 can be a function equals (Case1, Case2). In this example, if the user's problem matches the problem of the selected case, then the function equals (Case1, Case2) returns TRUE in a message 634.

Because the message 630 (for example, handleMatch (task_id, matchedCase)) results in TRUE, the decision maker module 610 can enter a Reuse stage and can provide a message 636 to the server 606 which can adjust the statistics of the selected case. The server 606 can provide a message 638 to the UI 604. The UI 604 can provide a message 640 to the user 602. The messages 638 and 640 can serve, ultimately, to inform the user 602 of the decision (for example, "Case reused. Adjusted Case statistics.").

Figure 7:
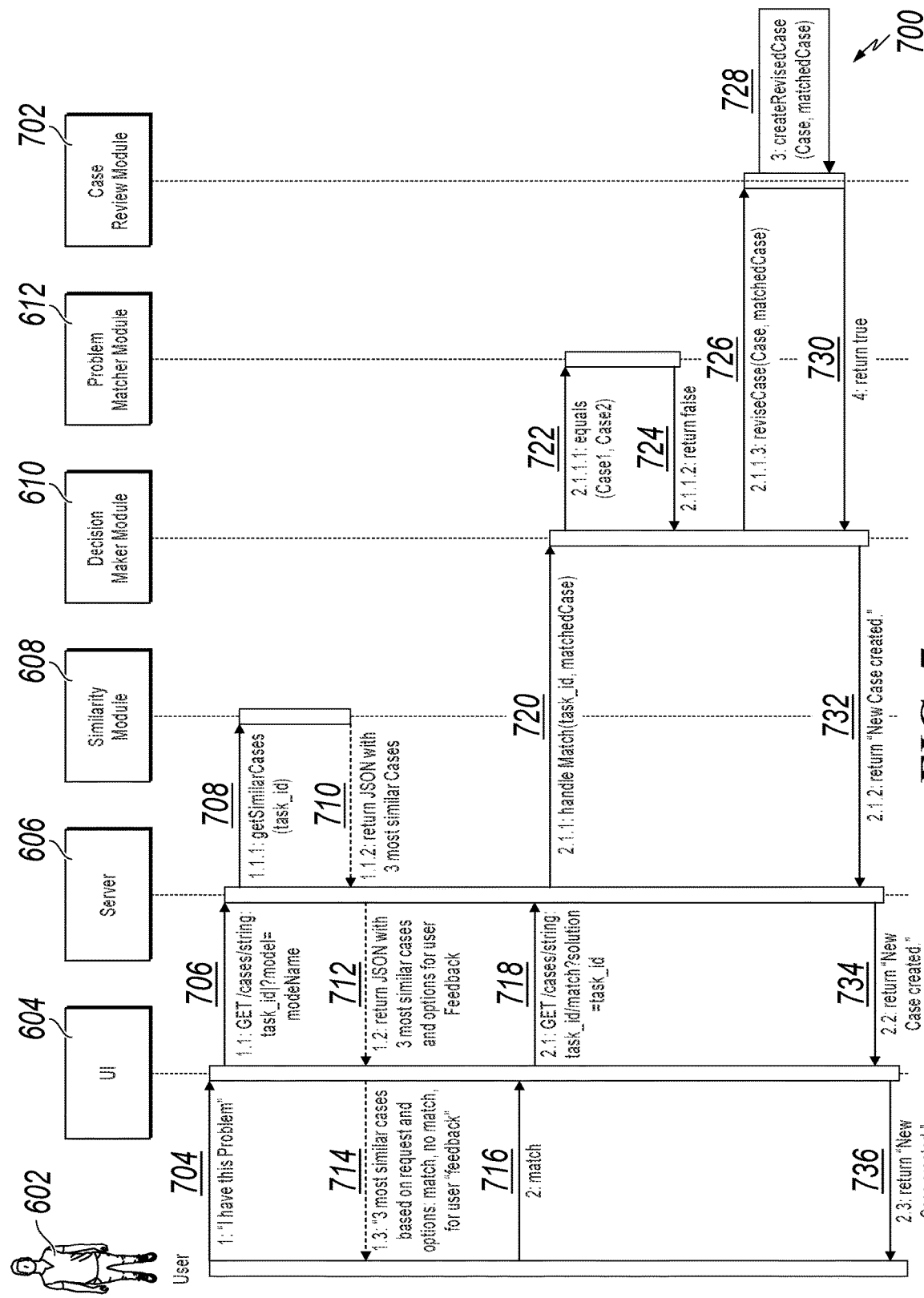
FIG. 7 is a swim lane diagram showing examples of steps and interactions in a process for creating a new case.

FIG. 7 is a swim lane diagram showing examples of operations and interactions in a process 700 for creating a new case. Operations and interactions of the process 700 include interactions with a case review module 702 (for example, the case review module 120) in addition to the user 602, the UI 604, the server 606, the similarity module 608, the decision maker module 610, and the problem matcher module 612 that are used in process 600.

The process 700 can start out the same as the process 600, with operations 704-714 matching or similar to operations 614-624. For example, when a problem on the user's side occurs, a message 704 is generated and sent to the UI 604. The message 704 allows the user 602 to inform the UI of the CBR-application about the problem. At this time, the application can enter the Retrieve stage. Using a message 706, the UI 604 can call the retrieve function (for example, using the <<cbr-python_api>>) to get the most similar cases to the user's problem. For example, using the message 706, the UI 604 can call the server 606 using/cases/string:task_id. Using a message 708, the server 606 can call the similarity module 608 with the function, for example, getSimilarCases (task_id). Over a sequence of messages 710, 712, and 714, the function can return the three most similar cases to the user's problem and the related confidence level. For example, the server 606 can return the three most similar cases and some URLs for options, including feedback URLs for the cases of Match versus No-match, and actions of Reuse versus Revise. The UI 604 can provide the three most similar cases and the options included to the user 602.

Operations 716 through 724 can match or are similar to the operations 626-634. For example, if the user 602 decides that the second case of the three cases includes the solution needed for the user's problem, then the user 602 can make a selection 716 for the option match. The UI 604 can generate a message 718 to the server 606, using the URL related to reuse of the case. The server 606 can send a message 720 to the decision maker module 610, for example, calling the handleMatch (task_id, matchedCase) function. The function can be used to decide whether the user triggered the Revise stage or the Reuse stage. The decision maker module 610 can compare the user's problem with the problem of the case and the selected solution. The decision maker module 610 can create and send a new object 722 to the problem matcher module 612. For example, the object 722 can be a function equals (Case1, Case2). In this example, if the user's problem does not match the problem of the selected case, the function equals (Case1, Case2) can return FALSE through a message 724.

Because the handleMatch (task_id, matchedCase) receives a FALSE result, the decision maker module 610 can decide to enter the Revise stage. The problem matcher module 612 can call the case review module 702 using a message 726 that includes, for example, the reviseCase (Case, matchedCase) function of the CaseReviser. At the case review module 702, the reviseCase (Case, matchedCase) function can create (728) a new case with the user's problem and the selected solution. In a message 730 sent to the decision maker module 610, the case review module 702 can return TRUE when the case has been successfully created. Using a sequence of messages 732, 734, and 736, the decision maker module 610 can inform the server 606 with a "New Case created" status, which can be forwarded to the UI 604 and the user 602.

Figure 8:
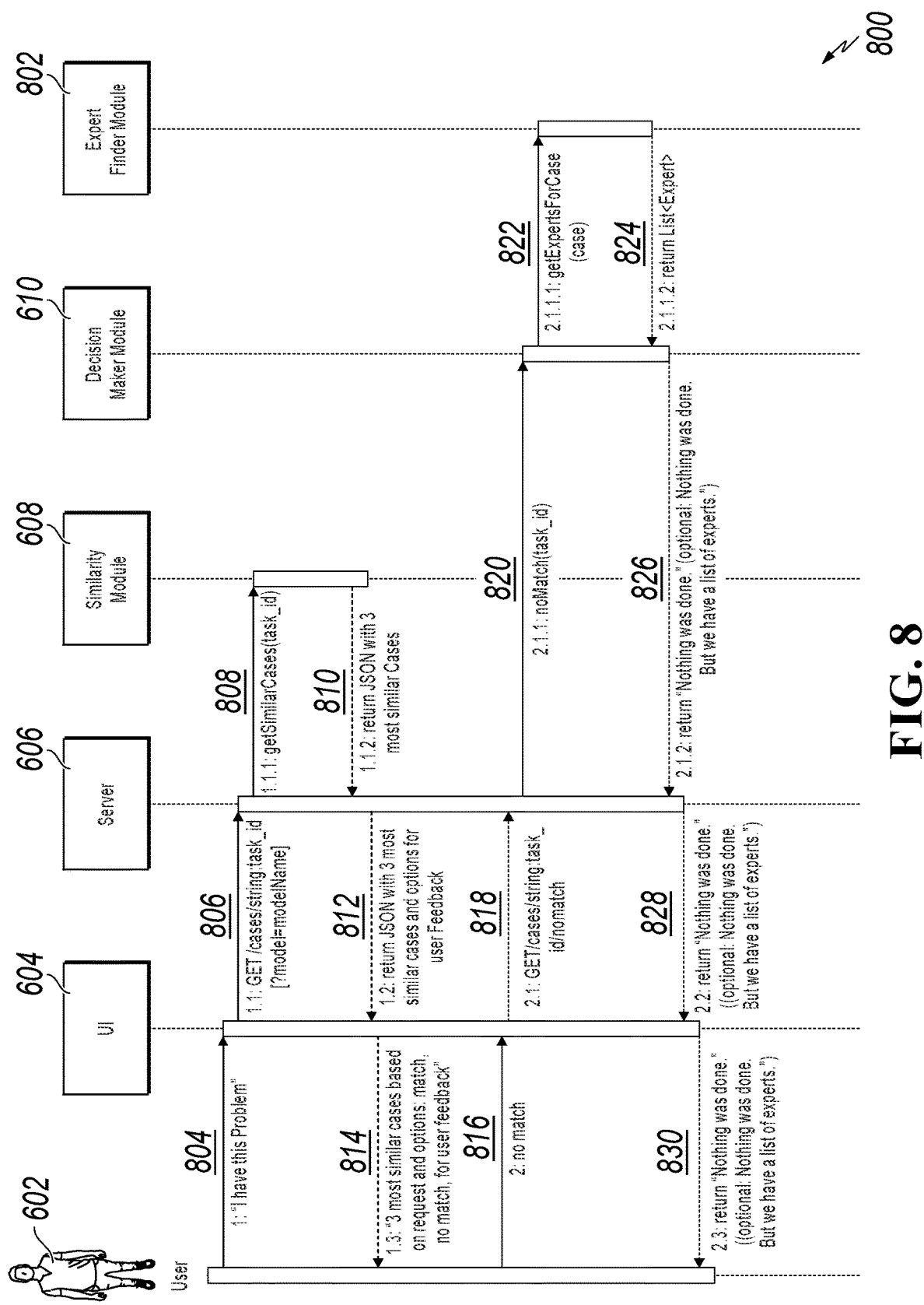
FIG. 8 is a swim lane diagram showing examples of steps and interactions in a process for suggesting an expert when no existing cases have problems that match a new problem.

FIG. 8 is a swim lane diagram showing examples of operations and interactions in a process 800 for suggesting an expert when no existing cases have problems that match a new problem. Operations and interactions of the process 800 include interactions with an expert finder module 802 (for example, the expert finder module 122) in addition to the user 602, the UI 604, the server 606, the similarity module 608, and the decision maker module 610 that are used in processes 600 and 700.

As does process 700, process 800 can also start out the same as process 600, with operations 804-814 matching or similar to operations 614-624. For example, when a problem on the user's side occurs, a message 804 is generated and sent to the UI 604 which allows the user 602 to inform the UI of the CBR-application about the problem. At this time, the application can enter the Retrieve stage. Using a message 806, the UI 604 can call the retrieve function (for example, using the <<cbr-python_api>>) to get the most similar cases to the user's problem. For example, using the message 806, the UI 604 can call the server 606 using /cases/string: task_id. Using a message 808, the server 606 can call the similarity module 608 with the function, for example, getSimilarCases (task_id). Over a sequence of messages 810, 812, and 814, the function can return the three cases that are most similar to the user's problem with related confidence levels. For example, the server 606 can return the three most similar cases and some URLs for options, including feedback URLs for the cases of Match versus No-match, and actions of Reuse versus Revise. The UI 604 can provide the three most similar cases and corresponding feedback options to the user 602.

The user 602 can decide that none of the proposed solutions of the three returned cases meet the user's needs. The user 602 can send a message 816 to this effect to the UI 604. The UI 604 can send a message 818 to the server 606 which can use a message 820 to call a noMatch (task_id) function of the DecisionMaker class. This function can trigger the function getExpertForCase (case) of the ExpertFinder class. This function can return a list of experts based on the user's problem. The decision maker module 610 can send a message 822 to the expert finder module 802 to request experts that can help with the user's problem. Using a message 824, the expert finder module 802 can provide a list of experts to the decision maker module 610. The decision maker module 610 can send a message 826 to the server 606 that "Nothing was done" and optionally "But we have a list of experts." Using messages 828 and 830, the information can be forwarded back through the UI 604 to the user 602.

Figure 9:
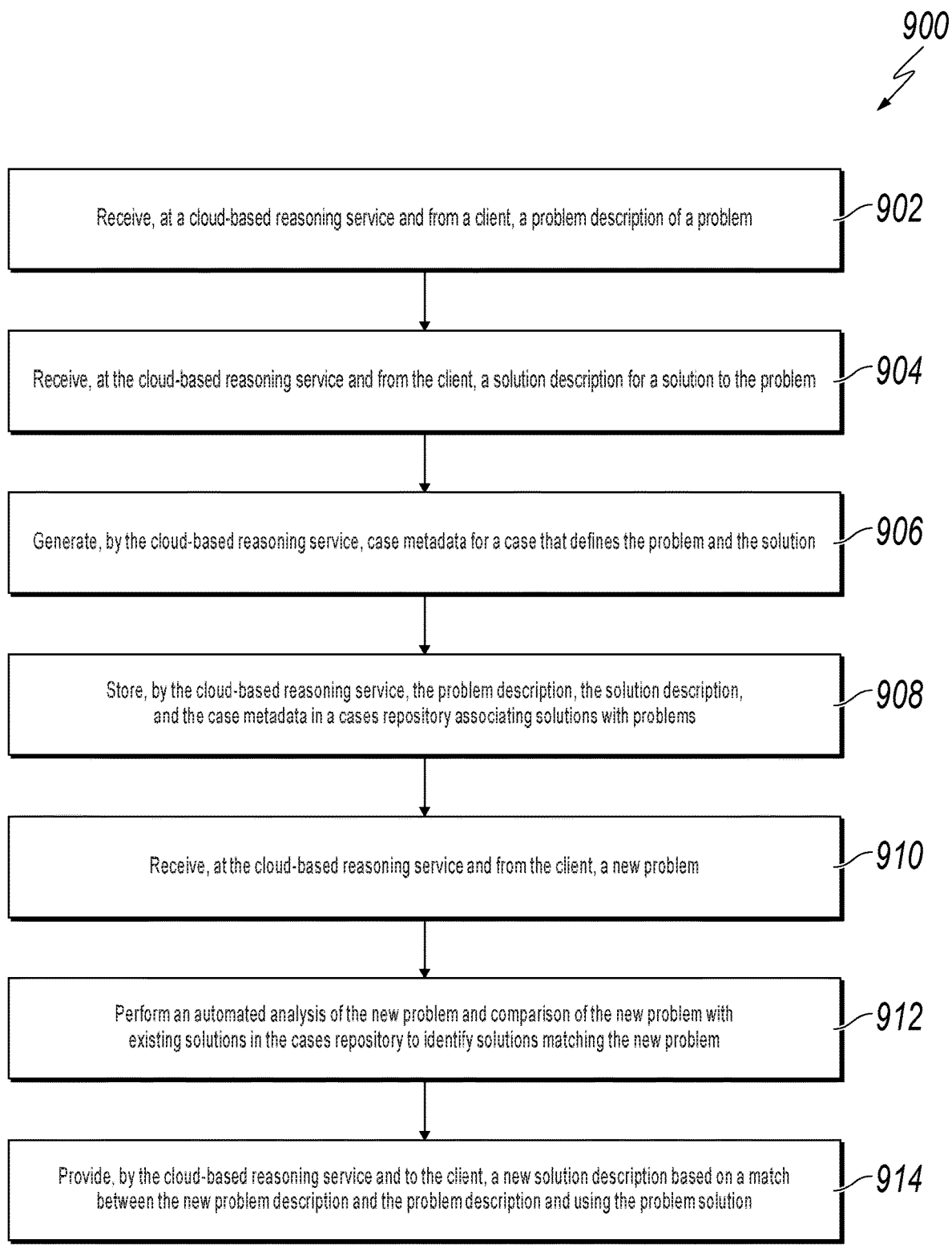
FIG. 9 is a flowchart of an example method for determining solutions through a case-based reasoning service.

FIG. 9 is a flowchart of an example method 900 for determining solutions through a case-based reasoning service. Method 900 can be performed by the CBRS 102, for example. Operations 902 through 908 can be performed repeatedly for multiple cases and used a learning process. For clarity of presentation, the description that follows generally describes method 900 in the context of FIGS. 1-8.

At 902, a problem description of a problem is received, from a client, at a case-based reasoning service. For example, over time the CBRS 102 can receive case information for problems that have been handled and solved by the user 104.

At 904, a solution description for a solution to the problem is received, from a client, at the case-based reasoning service. For example, the CBRS 102 can also receive case information that includes the corresponding solutions identified by the user 104.

At 906, case metadata for a case that defines the problem and the solution are generated by the case-based reasoning service. For example, the CBRS 102 can create and maintain metadata for each of the problems and solutions received from the user 104. The metadata can be updated over time as cases and corresponding solutions are reused or other actions are taken (for example, suggesting an expert).

At 908, the case metadata including the problem description and the solution description are stored by the case-based reasoning service in a cases repository associating solutions with problems. For example, the CBRS 102 can store the case information (problems and solutions) in the cases repository 126.

At 910, a new problem is received, from the client, at the case-based reasoning service. For example, the CBRS 102 can receive a new problem identified by the user 104 though the UI 106.

At 912, an automated analysis of the new problem is performed and a comparison is made of the new problem with existing solutions in the cases repository to identify solutions matching or significantly similar to the new problem. As an example, the problem matcher module 118 can identify a case from the cases repository 126 having a problem that matches or is significantly similar to the new problem of the user 104.

At 914, a new solution description is provided by the case-based reasoning service to the client. The new solution description is based on a match or similarity between the new problem description and the problem description. For example, the CBRS 102 can provide the solution to the client 108 for presentation to the user 104 through the UI 106.

In some implementations, method 900 can further include operations for updating existing cases stored by the CBRS 102. For example, updates to the solution description for the case can be received from the client at the CBRS 102. The CBRS can then update the solution description for the case in the cases repository 126.

Figure 10:
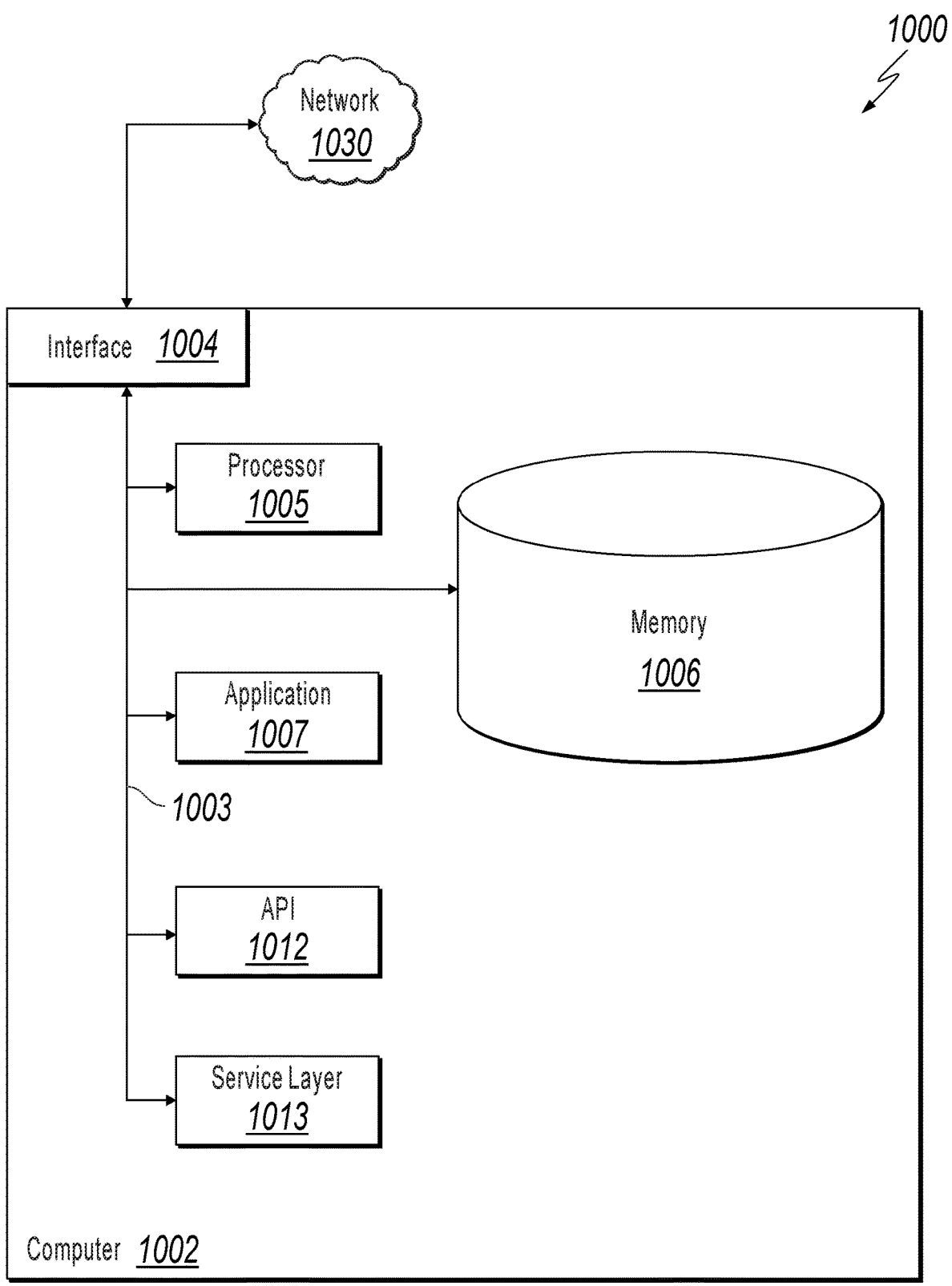
FIG. 10 is a block diagram of an exemplary computer system used to provide computational functionalities associated with described algorithms, methods, functions, processes, flows, and procedures as described in the instant disclosure.

In some implementations, method 900 can further include operations for allowing cases to be shared with other users. For example, a share authorization for the case can be received at the CBRS 102 from the client identifying other users or groups who can use information from the cases. The cases repository can then be updated to make the case accessible by other clients, for example, to share already persisted cases with other companies. For example, Company A can use a service to share its data with Company B. From a commercial point-of-view, Company A can receive a fee from Company B, where the fee is based on a number of requests that have been made. In another business model, Company A can collect data from other companies to improve their own data base. Authentication can be provided using oAuth or different methods. FIG. 10 is a block diagram of an exemplary computer system 1000 used to provide computational functionalities associated with described algorithms, methods, functions, processes, flows, and procedures as described in the instant disclosure.

The illustrated computer 1002 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 1002 may comprise a computer that includes an input device, such as a keypad, keyboard, touch screen, or other device that can accept user information, and an output device that conveys information associated with the operation of the computer 1002, including digital data, visual, or audio information (or a combination of information), or a graphical user interface (GUI).

The computer 1002 can serve in a role as a client, network component, a server, a database or other persistency, or any other component (or a combination of roles) of a computer system for performing the subject matter described in the instant disclosure. The illustrated computer 1002 is communicably coupled with a network 1030. In some implementations, one or more components of the computer 1002 may be configured to operate within environments, including cloud-computing-based, local, global, or other environment (or a combination of environments).

At a high level, the computer 1002 is an electronic computing device operable to receive, transmit, process, store, or manage data and information associated with the described subject matter. According to some implementations, the computer 1002 may also include or be communicably coupled with an application server, e-mail server, web server, caching server, streaming data server, business intelligence (BI) server, or other server (or a combination of servers).

The computer 1002 can receive requests over network 1030 from a client application (for example, executing on another computer 1002) and responding to the received requests by processing the said requests in an appropriate software application. In addition, requests may also be sent to the computer 1002 from internal users (for example, from a command console or by other appropriate access method), external or third-parties, other automated applications, as well as any other appropriate entities, individuals, systems, or computers.

Each of the components of the computer 1002 can communicate using a system bus 1003. In some implementations, any or all of the components of the computer 1002, both hardware or software (or a combination of hardware and software), may interface with each other or the interface 1004 (or a combination of both) over the system bus 1003 using an API 1012 or a service layer 1013 (or a combination of the API 1012 and service layer 1013). The API 1012 may include specifications for routines, data structures, and object classes. The API 1012 may be either computer-language independent or dependent and refer to a complete interface, a single function, or even a set of APIs. The service layer 1013 provides software services to the computer 1002 or other components (whether or not illustrated) that are communicably coupled to the computer 1002. The functionality of the computer 1002 may be accessible for all service consumers using this service layer. Software services, such as those provided by the service layer 1013, provide reusable, defined business functionalities through a defined interface. For example, the interface may be software written in JAVA, C++, or other suitable language providing data in extensible markup language (XML) format or other suitable format. While illustrated as an integrated component of the computer 1002, alternative implementations may illustrate the API 1012 or the service layer 1013 as stand-alone components in relation to other components of the computer 1002 or other components (whether or not illustrated) that are communicably coupled to the computer 1002. Moreover, any or all parts of the API 1012 or the service layer 1013 may be implemented as child or sub-modules of another software module, enterprise application, or hardware module without departing from the scope of the instant disclosure.

The computer 1002 includes an interface 1004. Although illustrated as a single interface 1004 in FIG. 10, two or more interfaces 1004 may be used according to particular needs, desires, or particular implementations of the computer 1002. The interface 1004 is used by the computer 1002 for communicating with other systems in a distributed environment that are connected to the network 1030 (whether illustrated or not). Generally, the interface 1004 comprises logic encoded in software or hardware (or a combination of software and hardware) and operable to communicate with the network 1030. More specifically, the interface 1004 may comprise software supporting one or more communication protocols associated with communications such that the network 1030 or interface's hardware is operable to communicate physical signals within and outside of the illustrated computer 1002.

The computer 1002 includes a processor 1005. Although illustrated as a single processor 1005 in FIG. 10, two or more processors may be used according to particular needs, desires, or particular implementations of the computer 1002. Generally, the processor 1005 executes instructions and manipulates data to perform the operations of the computer 1002 and any algorithms, methods, functions, processes, flows, and procedures as described in the instant disclosure.

The computer 1002 also includes a memory 1006 that holds data for the computer 1002 or other components (or a combination of both) that can be connected to the network 1030 (whether illustrated or not). For example, memory 1006 can be a database storing data consistent with this disclosure. Although illustrated as a single memory 1006 in FIG. 10, two or more memories may be used according to particular needs, desires, or particular implementations of the computer 1002 and the described functionality. While memory 1006 is illustrated as an integral component of the computer 1002, in alternative implementations, memory 1006 can be external to the computer 1002.

The application 1007 is an algorithmic software engine providing functionality according to particular needs, desires, or particular implementations of the computer 1002, particularly with respect to functionality described in this disclosure. For example, application 1007 can serve as one or more components, modules, applications, etc. Further, although illustrated as a single application 1007, the application 1007 may be implemented as multiple applications 1007 on the computer 1002. In addition, although illustrated as integral to the computer 1002, in alternative implementations, the application 1007 can be external to the computer 1002.

There may be any number of computers 1002 associated with, or external to, a computer system containing computer 1002, each computer 1002 communicating over network 1030. Further, the term "client," "user," and other appropriate terminology may be used interchangeably as appropriate without departing from the scope of this disclosure. Moreover, this disclosure contemplates that many users may use one computer 1002, or that one user may use multiple computers 1002.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a GUI. The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
   receiving, at a case-based reasoning service and from a client, a problem description of a problem;
   receiving, at the case-based reasoning service and from the client, a solution description for a solution to the problem;
   generating, by the case-based reasoning service, case metadata for a case that defines the problem and the solution;
   storing, by the case-based reasoning service, the problem description, the solution description, and the case metadata in a cases repository associating solutions with problems;
   receiving, at the case-based reasoning service and from the client, a new problem;
   performing an automated analysis of the new problem and comparison of the new problem with existing solutions in the cases repository to identify solutions matching the new problem;
   providing, by the case-based reasoning service and to the client, a new solution description based on a match between the new problem description and the problem description and using the problem solution;
   receiving, at the case-based reasoning service and from the client, feedback associated with the new solution description;
   updating, by the case-based reasoning service and using the feedback, statistics about that new solution description;
   determining, by the case-based reasoning service and using the feedback, that the new solution description has not been selected;
   identifying, by the case-based reasoning service and using the feedback, an expert to contact or another solution avenue; and
   providing, by the case-based reasoning service and to the client, information identifying the expert to contact or the other solution avenue.

2. The computer-implemented method of claim 1, wherein the problem description includes one or more of a vector of problem attributes and problem text, and wherein the solution description includes one or more of a vector of solution attributes and solution text.

3. The computer-implemented method of claim 2, wherein providing the new solution description includes identifying, from the cases repository, at least one solution associated with at least one problem having a problem description matching a new problem description of the new problem.

4. The computer-implemented method of claim 1, wherein the case metadata includes case owner information, case creation and modification dates, and relationships to other cases.

5. The computer-implemented method of claim 1, wherein the problem description, the solution description, the new problem description, and the new solution description are sent through an application programming interface (API) used by a client accessing the case-based reasoning service through the cloud.

6. The computer-implemented method of claim 1, further comprising:
   receiving, at the case-based reasoning service and from the client, updates to the solution description for the case; and
   updating, by the case-based reasoning service, the solution description for the case in the cases repository.

7. The computer-implemented method of claim 1, further comprising:

receiving, at the case-based reasoning service and from the client, a share authorization for the case; and updating, by the case-based reasoning service, the cases repository to make the case accessible by other clients.

8. A system comprising:

memory storing tables storing cases associating problems and solutions, and metadata identifying the use of the cases over time; and a server performing operations comprising:

receiving, at a case-based reasoning service and from a client, a problem description of a problem;

receiving, at the case-based reasoning service and from the client, a solution description for a solution to the problem;

generating, by the case-based reasoning service, case metadata for a case that defines the problem and the solution;

storing, by the case-based reasoning service, the problem description, the solution description, and the case metadata in a cases repository associating solutions with problems;

receiving, at the case-based reasoning service and from the client, a new problem;

performing an automated analysis of the new problem and comparison of the new problem with existing solutions in the cases repository to identify solutions matching the new problem;

providing, by the case-based reasoning service and to the client, a new solution description based on a match between the new problem description and the problem description and using the problem solution;

receiving, at the case-based reasoning service and from the client, feedback associated with the new solution description;

updating, by the case-based reasoning service and using the feedback, statistics about that new solution description;

determining, by the case-based reasoning service and using the feedback, that the new solution description has not been selected;

identifying, by the case-based reasoning service and using the feedback, an expert to contact or another solution avenue; and providing, by the case-based reasoning service and to the client, information identifying the expert to contact or the other solution avenue.

9. The system of claim 8, wherein the problem description includes one or more of a vector of problem attributes and problem text, and wherein the solution description includes one or more of a vector of solution attributes and solution text.

10. The system of claim 9, wherein providing the new solution description includes identifying, from the cases repository, at least one solution associated with at least one problem having a problem description matching a new problem description of the new problem.

11. The system of claim 8, wherein the case metadata includes case owner information, case creation and modification dates, and relationships to other cases.

12. The system of claim 8, wherein the problem description, the solution description, the new problem description, and the new solution description are sent through an application programming interface (API) used by a client accessing the case-based reasoning service through the cloud.

13. A non-transitory computer-readable media encoded with a computer program, the program comprising instructions that when executed by one or more computers cause the one or more computers to perform operations comprising:

receiving, at a case-based reasoning service and from a client, a problem description of a problem;

receiving, at the case-based reasoning service and from the client, a solution description for a solution to the problem;

generating, by the case-based reasoning service, case metadata for a case that defines the problem and the solution;

storing, by the case-based reasoning service, the problem description, the solution description, and the case metadata in a cases repository associating solutions with problems;

receiving, at the case-based reasoning service and from the client, a new problem;

performing an automated analysis of the new problem and comparison of the new problem with existing solutions in the cases repository to identify solutions matching the new problem;

providing, by the case-based reasoning service and to the client, a new solution description based on a match between the new problem description and the problem description and using the problem solution;

receiving, at the case-based reasoning service and from the client, feedback associated with the new solution description;

updating, by the case-based reasoning service and using the feedback, statistics about that new solution description;

determining, by the case-based reasoning service and using the feedback, that the new solution description has not been selected;

identifying, by the case-based reasoning service and using the feedback, an expert to contact or another solution avenue; and providing, by the case-based reasoning service and to the client, information identifying the expert to contact or the other solution avenue.

14. The non-transitory computer-readable media of claim 13, wherein the problem description includes one or more of a vector of problem attributes and problem text, and wherein the solution description includes one or more of a vector of solution attributes and solution text.

15. The non-transitory computer-readable media of claim 14, wherein providing the new solution description includes identifying, from the cases repository, at least one solution associated with at least one problem having a problem description matching a new problem description of the new problem.

16. The non-transitory computer-readable media of claim 13, wherein the case metadata includes case owner information, case creation and modification dates, and relationships to other cases.

17. The non-transitory computer-readable media of claim 13, wherein the problem description, the solution description, the new problem description, and the new solution description are sent through an application programming interface (API) used by a client accessing the case-based reasoning service through the cloud.

* * * * *